United States Patent
Roland et al.

(10) Patent No.: US 11,735,126 B1
(45) Date of Patent: Aug. 22, 2023

(54) ELECTRONIC DEVICES WITH COLOR SAMPLING SENSORS

(71) Applicant: Apple Inc., Cupertino, CA (US)

(72) Inventors: Jackson K. Roland, San Francisco, CA (US); Nicolas P. Bonnier, Campbell, CA (US); Alexandre Chapiro, Sunnyvale, CA (US); David A. Doyle, Cupertino, CA (US); Guillaume Lestoquoy, Mountain View, CA (US); Jonathan C. Moisant-Thompson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/379,386

(22) Filed: Jul. 19, 2021

Related U.S. Application Data (60) Provisional application No. 63/065,258, filed on Aug. 13, 2020.

(51) Int. Cl.
  *G09G 3/34* (2006.01)
  *G09G 3/3233* (2016.01)
  *G06F 1/16* (2006.01)
  *G06V 10/56* (2022.01)

(52) U.S. Cl.
  CPC ........... *G09G 3/3413* (2013.01); *G06F 1/163* (2013.01); *G06V 10/56* (2022.01); *G09G 3/3233* (2013.01); *G09G 3/342* (2013.01); *G09G 2320/0666* (2013.01); *G09G 2340/06* (2013.01)

(58) Field of Classification Search
  CPC ......... G09G 3/30–3208; G09G 3/3406; G09G 3/3413; G09G 3/3233; G09G 3/342; G09G 5/02; G09G 5/06; G09G 2320/0666; G09G 2340/06; G09G 2360/14–148; G06F 1/163; G06F 3/014; G06V 10/141; G06V 10/143; G06V 10/56; G06V 10/60; G05G 9/0017; G04G 21/02; H03K 2217/941–94112
  See application file for complete search history.

(56) References Cited

U.S. PATENT DOCUMENTS

| | | | |
|---|---|---|---|
| 8,947,627 | B2 | 2/2015 | Rappoport et al. |
| 9,310,843 | B2 | 4/2016 | Shedletsky et al. |
| 10,157,590 | B1 | 12/2018 | Aflatooni et al. |
| 10,163,984 | B1 | 12/2018 | Ho et al. |
| 10,175,653 | B1 * | 1/2019 | Bloom ............... G04B 45/00 |

(Continued)

*Primary Examiner* — Keith L Crawley
(74) *Attorney, Agent, or Firm* — Treyz Law Group, P.C.; Kendall P. Woodruff (57) ABSTRACT

An electronic device such as a watch may include a display and a light sensor located behind the display. The light sensor may be used to measure the color of external objects. During color sampling operations, the display may emit light towards the external object in front of the display while the light sensor gathers color measurements. The display may emit light of different colors and the light sensor may detect an amount of reflected light for each color, which in turn may be used to determine the color of the external object. The control circuitry may use a watch-band-specific algorithm to determine the color of watch bands and may use a clothing-specific algorithm to determine the color of clothing. The control circuitry may display the color on the display so that the face of the watch matches the user's clothing or matches the user's watch band.

19 Claims, 8 Drawing Sheets

(56) References Cited

U.S. PATENT DOCUMENTS

| | | | |
|---|---|---|---|
| 10,268,884 B2 | 4/2019 | Jones et al. | |
| 10,620,590 B1 * | 4/2020 | Guzman | G04G 9/06 |
| 10,644,077 B1 * | 5/2020 | Choi | H01L 29/78648 |
| 10,963,671 B2 | 3/2021 | Pi et al. | |
| 2008/0303918 A1 * | 12/2008 | Keithley | G09G 3/20 |
| | | | 348/223.1 |
| 2011/0109538 A1 * | 5/2011 | Kerr | G09G 5/36 |
| | | | 715/765 |
| 2011/0176038 A1 * | 7/2011 | Kurokawa | H01L 29/7869 |
| | | | 257/43 |
| 2015/0187327 A1 * | 7/2015 | Francis | G06F 1/163 |
| | | | 345/589 |
| 2017/0085688 A1 * | 3/2017 | Zhou | G06F 3/011 |
| 2017/0270342 A1 | 9/2017 | He et al. | |
| 2017/0303646 A1 * | 10/2017 | Bricken | G06F 1/1694 |
| 2018/0348959 A1 | 12/2018 | Lin et al. | |
| 2020/0225778 A1 * | 7/2020 | Lewty | G06F 3/04883 |
| 2020/0349375 A1 * | 11/2020 | Quigley | G01J 3/0208 |
| 2021/0368085 A1 * | 11/2021 | Ou | G09G 3/3208 |

\* cited by examiner

ELECTRONIC DEVICES WITH COLOR SAMPLING SENSORS

This application claims the benefit of provisional patent application No. 63/065,258, filed Aug. 13, 2020, which is hereby incorporated by reference herein in its entirety.

FIELD

This relates generally to electronic devices, and, more particularly, to electronic devices with displays.

BACKGROUND

Electronic devices often include displays. For example, a wristwatch may have a display for displaying the time and for displaying other image content. Some electronic devices allow a user to customize the color scheme of the display. For example, a user may select a color for the background of the display from a preset palette of colors.

A user may have a limited set of options to choose from when selecting a color for a display. The preset palette of colors may be unsatisfactory, may not include colors that match the user's clothes or watch band, or may otherwise not fit the user's desired aesthetic.

SUMMARY

An electronic device such as a watch may include a display and a light sensor located behind the display. The light sensor may be used to measure the color of external objects.

During color sampling operations, the display may emit light towards the external object in front of the display while the light sensor gathers color measurements. The display may emit a sequence of red, green, and blue light and the light sensor may detect an amount of reflected red light, reflected green light, and reflected blue light to determine the reflectance of the external object. Control circuitry in the electronic device may determine the color of the external object based on its measured reflectance.

The control circuitry may use a watch-band-specific algorithm to determine the color of watch bands and may use a clothing-specific algorithm to determine the color of clothing. The watch-band-specific algorithm may be used to map different sensor readings to different watch band colors from a predetermined list of watch band colors. The clothing-specific algorithm may be used to map sensor readings to any color within a color gamut. The control circuitry may display the color on the display so that the face of the watch matches the user's clothing or matches the user's watch band. The control circuitry may apply constraints to map measured colors to acceptable display colors that meet desired criteria.

DETAILED DESCRIPTION

An electronic device may have a display and control circuitry. The display may include a display panel with an array of pixels for displaying images. A light sensor may be at least partially overlapped by the display.

A user may select a color for the display using a color sampling process that matches the display color to the color of an external object such as a watch band or piece of clothing. To determine the color of the external object, the control circuitry may use the display to illuminate the external object and may gather corresponding reflectance data from the light sensor behind the display. Based on the emitted light and the measured reflected light, the control circuitry may determine the color of the external object and may display the color on the display.

Figure 1:
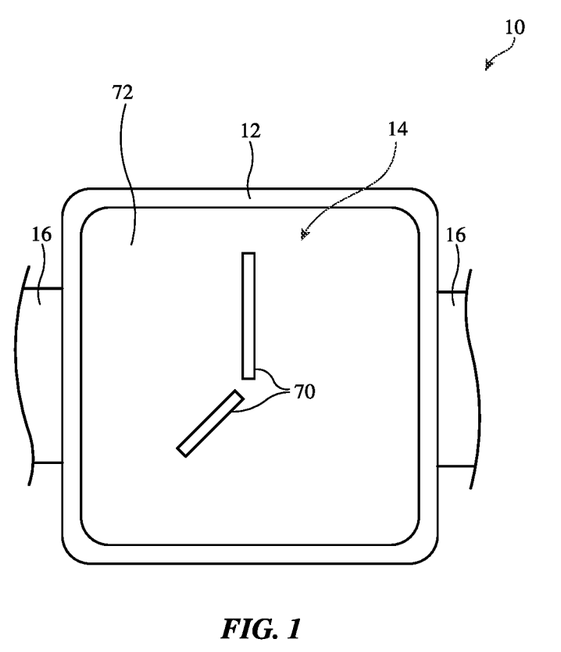
FIG. 1 is a top view of an illustrative electronic device with a display in accordance with an embodiment.

A top view of an illustrative electronic device of the type that may be provided with a display having color sampling capabilities is shown in FIG. 1. Device 10 of FIG. 1 may be a portable device such as a wristwatch having a wristband such as wristband 16, may be a portable device without a wristband such as a cellular telephone or tablet computer, or may be other suitable electronic equipment (e.g., a desktop computer, a voice-control speaker with a display panel, a television or other non-portable display, a head-mounted device, an embedded system such as a system built into a vehicle or home, an electronic device accessory, and/or other electronic device). Illustrative configurations in which device 10 is a wristwatch may sometimes be described herein as an example.

As shown in FIG. 1, device 10 includes a housing such as housing 12. Housing 12 may be formed from polymer, metal, glass, crystalline material such as sapphire, ceramic, fabric, fibers, fiber composite material, natural materials such as wood and cotton, other materials, and/or combinations of such materials. Housing 12 may be configured to form housing walls. The housing walls may enclose one or more interior regions in which internal device components are mounted and may separate the interior region of device 10 from the exterior environment surrounding device 10. In some configurations, an opening may be formed in housing 12 for a data port, a power port, to accommodate audio components, or to accommodate other devices. Clear housing regions may be used to form optical component windows. In the illustrative arrangement of FIG. 1, a transparent housing layer may cover the upper surface of device 10 and may serve as a protective display cover layer for display 14. If desired dielectric housing structures may be used to form radio-transparent areas for antennas and wireless power components.

Device 10 may include one or more displays such as display 14 (e.g., a display that includes a two-dimensional capacitive touch sensor and/or other touch sensor or a display that is insensitive to touch). Display 14 may, for example, be a light-emitting diode display such as an organic light-emitting diode display or a display having an array of pixels formed from crystalline light-emitting diode dies such as micro-light-emitting diode dies. The pixels of display 14 may be overlapped by a transparent housing structure (sometimes referred to as a transparent display cover layer, protective cover layer structures, etc.).

Display 14 may be configured to display images for a user. Some images may include display elements such as display elements 70 on a background such as background 72. The color of display elements 70 (e.g., user interface elements, buttons, icons, text, graphics, notifications, etc.) and/or the color of background 72 may be customized by a user. For example, a user may select a desired color for background 72 and/or for display elements 70. The color may be selected from a predetermined set of colors or may be matched to the color of an external object such as a watch band (e.g., watch band 16 or other watch band), a piece of clothing (e.g., a shirt or any other clothing item), or any other suitable external object. For example, a user may hold an external object over the display so that one or more sensors in device 10 can measure the color of the external object and produce the same color on display 14. This color sampling process may allow the user to customize the appearance of display 14 so that the color scheme on display 14 matches with the user's watch band, clothing, or other item.

Figure 2:
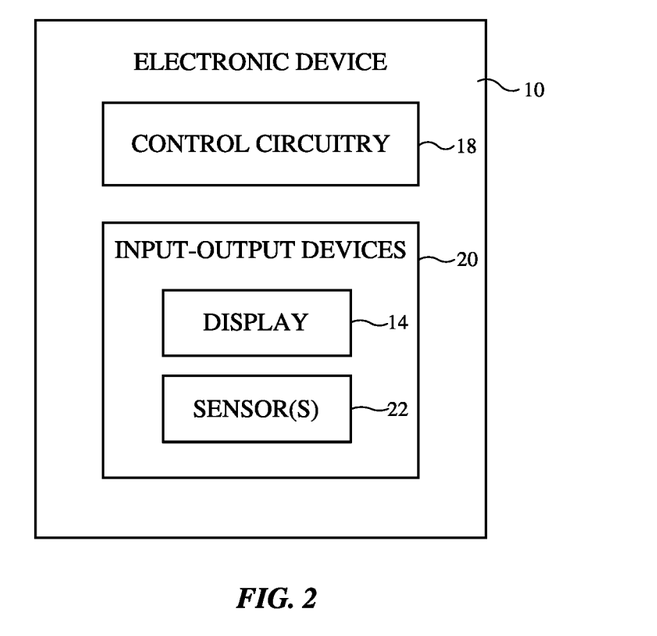
FIG. 2 is a schematic diagram of an illustrative electronic device with a display and one or more sensors in accordance with an embodiment.

FIG. 2 is a schematic diagram of an illustrative electronic device 10 such as device 10 of FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device (as shown in the example of FIG. 1), a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 2, electronic device 10 may include control circuitry 18 for supporting the operation of device 10. Control circuitry 18 may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 18 may be used to control the operation of device 10. The processing circuitry may be based on one or more microprocessors, microcontrollers, digital signal processors, baseband processors, power management units, audio chips, application-specific integrated circuits, etc.

Input-output circuitry in device 10 such as input-output devices 20 may be used to allow data to be supplied to device 10 and to allow data to be provided from device 10 to external devices. Input-output devices 20 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input resources of input-output devices 20 and may receive status information and other output from device 10 using the output resources of input-output devices 20.

Input-output devices 20 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 18 may be used to run software on device 10 such as operating system code and applications. During operation of device 10, the software running on control circuitry 18 may display images on display 14.

Input-output devices 20 may include one or more sensors 22 such as force sensors (e.g., strain gauges, capacitive force sensors, resistive force sensors, etc.), audio sensors such as microphones, touch and/or proximity sensors such as capacitive sensors (e.g., a two-dimensional capacitive touch sensor associated with a display and/or a touch sensor that forms a button, trackpad, or other input device not associated with a display), and other sensors. In accordance with some embodiments, sensors 22 may include optical sensors such as optical sensors that emit and detect light (e.g., optical proximity sensors such as transreflective optical proximity structures), ultrasonic sensors, and/or other touch and/or proximity sensors, monochromatic and color ambient light sensors, image sensors, fingerprint sensors, temperature sensors, proximity sensors and other sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 22 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

Display 14 may be an organic light-emitting diode display or may be a display based on other types of display technologies (e.g., liquid crystal displays). Device configurations in which display 14 is an organic light-emitting diode display are sometimes described herein as an example. This is, however, merely illustrative. Any suitable type of display may be used, if desired. In general, display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 3:
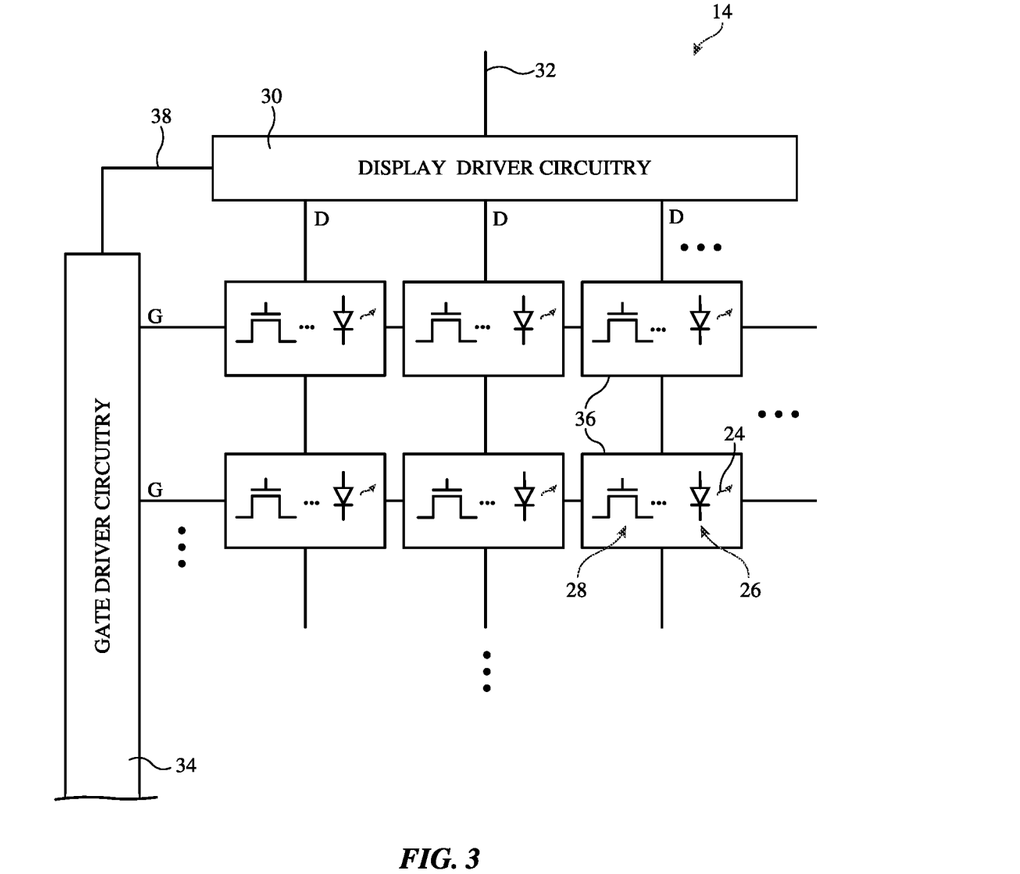
FIG. 3 is a schematic diagram of an illustrative display with light-emitting elements in accordance with an embodiment.

A top view of a portion of display 14 is shown in FIG. 3. As shown in FIG. 3, display 14 may have an array of pixels 36 formed on a substrate. Pixels 36 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 36 in display 14 (e.g., tens or more, hundreds or more, or thousands or more). Each pixel 36 may include a light-emitting diode 26 that emits light 24 under the control of a pixel control circuit formed from thin-film transistor circuitry such as thin-film transistors 28 and thin-film capacitors. Thin-film transistors 28 may be polysilicon thin-film transistors, semiconducting-oxide thin-film transistors such as indium zinc gallium oxide (IGZO) transistors, or thin-film transistors formed from other semiconductors. Pixels 36 may contain light-emitting diodes of different colors (e.g., red, green, and blue) to provide display 14 with the ability to display color images or may be monochromatic pixels.

Display driver circuitry may be used to control the operation of pixels 36. The display driver circuitry may be formed from integrated circuits, thin-film transistor circuits, or other suitable circuitry. Display driver circuitry 30 of FIG. 3 may contain communications circuitry for communicating with system control circuitry such as control circuitry 18 of FIG. 2 over path 32. Path 32 may be formed from traces on a flexible printed circuit or other cable. During operation, the control circuitry (e.g., control circuitry 18 of FIG. 2) may supply display driver circuitry 30 with information on images to be displayed on display 14.

To display the images on display pixels 36, display driver circuitry 30 may supply image data to data lines D while issuing clock signals and other control signals to supporting display driver circuitry such as gate driver circuitry 34 over path 38. If desired, display driver circuitry 30 may also supply clock signals and other control signals to gate driver circuitry 34 on an opposing edge of display 14.

Gate driver circuitry 34 (sometimes referred to as row control circuitry) may be implemented as part of an integrated circuit and/or may be implemented using thin-film transistor circuitry. Horizontal control lines G in display 14 may carry gate line signals such as scan line signals, emission enable control signals, and other horizontal control signals for controlling the display pixels 36 of each row. There may be any suitable number of horizontal control signals per row of pixels 36 (e.g., one or more row control signals, two or more row control signals, three or more row control signals, four or more row control signals, etc.).

The region on display 14 where the display pixels 36 are formed may sometimes be referred to herein as the active area. Electronic device 10 has an external housing with a peripheral edge. The region surrounding the active area and within the peripheral edge of device 10 is the border region. It is generally desirable to minimize the border region of device 10. For example, device 10 may be provided with a full-face display 14 that extends across the entire front face of the device. If desired, display 14 may also wrap around over the edge of the front face so that at least part of the lateral edges or at least part of the back surface of device 10 is used for display purposes.

Figure 4:
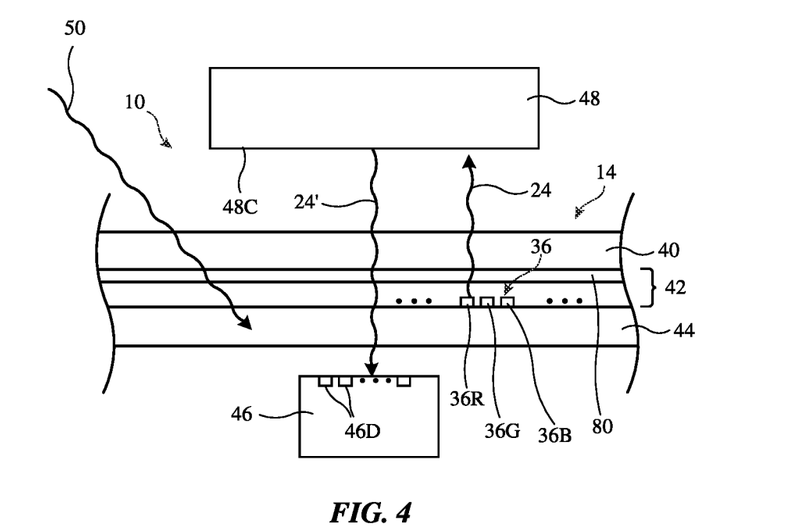
FIG. 4 is a cross-sectional side view of an illustrative display that at least partially covers a sensor in accordance with an embodiment.

Device 10 may include one or more sensors mounted behind display 14 (e.g., behind the active area of the display). FIG. 4 is a cross-sectional side view of illustrative display layers that at least partially cover one or more sensors. As shown in FIG. 4, display 14 may include a substrate such as substrate 44. Substrate 44 may be formed from glass, metal, plastic, ceramic, sapphire, or other suitable substrate materials. In some arrangements, substrate 44 may be an organic substrate formed from polyethylene terephthalate or polyethylene naphthalate (as examples). One or more polyimide layers may be formed over substrate 44. The polyimide layers may sometimes be referred to as an organic substrate (e.g., substrate 44 may be a first substrate layer and one or more polyimide layers may be a second substrate layer). Polyimide layers may optionally be covered with one or more buffer layers (e.g., inorganic buffer layers such as layers of silicon oxide, silicon nitride, amorphous silicon, etc.).

Display layers 42 may include thin-film transistor circuitry, organic light-emitting diode layers, encapsulation layers, and other suitable layers for forming a display. Thin-film transistor circuitry may include thin-film transistors, thin-film capacitors, associated routing circuitry, and other thin-film structures formed within metal routing layers and dielectric layers. Organic light-emitting diode layers may be formed over the thin-film transistor circuitry and may include a diode cathode layer, a diode anode layer, and emissive material interposed between the cathode and anode layers. The organic light-emitting diode layers may include a pixel definition layer that defines the light-emitting area of each pixel. The thin-film transistor circuitry in layers 42 may be used to control an array of display pixels 36 formed by the organic light-emitting diode materials in layers 42.

Display layers 42 may include one or more encapsulation layers such as one or more inorganic encapsulation layers and/or one or more organic encapsulation layers. Encapsulation layers in display layers 42 can help prevent moisture and other potential contaminants from damaging the conductive circuitry in layers 42.

Display layers 42 may include one or more polarizer films and/or one or more touch sensor layers. For example, touch sensor 80 in display layers 42 may include an array of capacitive touch sensor electrodes for forming a touch sensor in display 14. The array of capacitive touch sensor electrodes in touch sensor 80 may be formed on a common display substrate with display pixels 36 of display 14 or may be formed from a separate touch sensor layer that overlaps pixels 36 of display 14.

Display 14 may include a transparent cover layer such as cover layer 40. Cover layer 40 may be formed from glass, sapphire, polymer, and/or other suitable transparent materials and may serve as an outer protective layer for display 14.

As shown in FIG. 4, sensor 46 may be formed under display 14 in electronic device 10. Sensor 46 may be an optical sensor such as a camera, proximity sensor, ambient light sensor, fingerprint sensor, or other light-based sensor (e.g., other light-based sensors of the type described in connection with FIG. 2). Light sensor may, if desired, be an ambient light sensor that detects ambient light 50 that passes through display 14.

If desired, at least some of the display pixels may be selectively removed in regions of display 14 located over sensor 46. Regions of display 14 that at least partially cover or overlap sensor 46 in which at least a portion of the display pixels have been removed are sometimes referred to as pixel removal regions, pixel-free regions, etc. Removing display pixels and/or removing portions of display pixels (e.g., removing transistors and/or capacitors associated with one or more subpixels) in the pixel-free regions can help increase transmission and improve the performance of the under-display sensor 46. In addition to or instead of removing display pixels, portions of additional layers such as polyimide layers and/or substrate layers may be removed for additional transmission improvement. If desired, a polarizer layer in display 14 may also be bleached for additional transmission improvement.

In addition to or instead of sensing ambient light 50, sensor 46 may be used as a color sampling device that measures the color of external objects. For example, a real-world object such as external object 48 may be placed over display 14, as shown in FIG. 4. In this location, sensor 46 can be used to measure the color of object 48. Object 48 may be a watch band, an item of clothing, a piece of fabric, or any other suitable object. During color sampling operations, object 48 may be placed over display 14 (e.g., in contact with display 14 or in close proximity to display 14).

Device 10 can use a sampled color from sensor 46 when content is being displayed on display 14. For example, a measured color can be used as a background color on display 14 (e.g., the color of background 72 of FIG. 1) or can be used to generate a color palette for the entire color scheme used for display 14 (e.g., the color of background 72, display elements 70, icons, menu options, notifications, and other items on display 14 may be generated from a color palette that is based on the measured color of object 48).

Light sensor 46 may be formed from an integrated circuit (e.g., a silicon integrated circuit) and/or discrete light detecting components. In some arrangements, light sensor 46 may be a single-channel broadband photodetector (e.g., a photodiode) that detects light across the visible spectrum. In other arrangements, light sensor 46 may include multiple photodetectors to discriminate between different colors. For example, light detector 46 may have multiple photodetectors 46D each of which gathers and measures light in a different band of wavelengths. These bands of wavelengths, which may sometimes be referred to as channels or color channels, may overlap slightly with each other and may, if desired, provide continuous coverage of the visible light spectrum (and, if desired, portions of the infrared light spectrum and/or ultraviolet light spectrum). Each photodetector 46D may be overlapped by a corresponding thin-film interference filter with a desired light transmission spectrum and/or may be overlapped by a color filter formed from a layer of dye or pigment with a desired light transmission spectrum. The light transmission spectrum of each color filter may correspond to a band of wavelengths at a different location of the visible light spectrum or other desired portion of the light spectrum. For example, a red channel photodetector may have a color filter that passes red light wavelengths while blocking all other wavelengths. If desired, ultraviolet light sensitivity and/or infrared light sensitivity can be provided by incorporating ultraviolet and/or infrared channels into light detectors 46D. Arrangements in which light sensor 46 is used to make visible light measurements are sometimes described herein as an example.

In configurations in which light sensor 46 is formed from an integrated circuit, photodetectors 46D for different color channels can be distributed throughout the integrated circuit and, if desired, redundant photodetectors 46D (e.g., photodetectors measuring the same color of light) may be included in light sensor 46. As an example, photodetectors 46D may include photodetectors for 3-10 different color channels and each color channel may have 1-5 different individual photodetectors 46D for gathering a light measurement for that color channel. Supporting circuitry (e.g., switching circuitry, amplifier circuitry, analog-to-digital conversion circuitry, communications circuitry for supporting communications with control circuitry elsewhere in device 10, etc.) may be incorporated into an integrated circuit that contains photodetectors 46D or, if desired, some or all of this supporting circuitry for photodetectors 46D may be formed in one or more integrated circuits that are separate from photodetectors 46D.

Sensor 46 may be a light detector only or may include a light emitter in addition to a light detector. A light emitter in sensor 46 may be used to illuminate objects while the light detector in sensor 46 gathers corresponding color measurements. A light emitter in sensor 46 may contain one or more light-emitting devices such as lasers (e.g., laser diodes such as vertical cavity surface emitting diodes or other laser diodes), light-emitting diodes (e.g., organic light-emitting diodes, light-emitting diodes formed from crystalline semiconductor dies, etc.), or other light-emitting components. A light emitter in sensor 46 may, for example, include a single white light-emitting diode or may contain multiple light-emitting devices associated with different colors.

Instead of or in addition to including a light emitter in sensor 46, pixels 36 in display 14 may be used to illuminate external objects while sensor 46 gathers corresponding color measurements. Pixels 36 may include pixels of different colors (sometimes referred to as subpixels) such as red pixels 36R configured to emit red light (light in a band of wavelengths around a desired red wavelength), green pixels 36G configured to emit green light (light in a band of wavelengths around a desired green wavelength), and blue pixels 36B configured to emit blue light (light in a band of wavelengths around a desired blue wavelength). If desired, pixels 36 may include pixels of other colors. Arrangements in which pixels 36 include red, green, and blue pixels are sometimes described herein as an illustrative example.

During color sampling operations, pixels 36 may emit light 24 to illuminate external object 48 in front of display 14 while light sensor 46 makes corresponding color measurements based on the reflected light 24' that reflects off of object 48. Pixels 36 may illuminate objects such as object 48 with white light (e.g., using a combination of red, green, and blue light from pixels 36R, 36B, and 36B, and/or using white light from a white light-emitting diode or other white light source in pixels 36), and/or pixels 36 of different colors may be used separately to illuminate object 48 with red light only, green light only, blue light only, etc. For example, red pixels 36R be used to emit red light (without blue pixels 36B emitting blue light and without green pixels 36G emitting green light) while light sensor 46 makes a first set of color measurements using photodetectors 46D, blue pixels 36B may separately emit blue light while light sensor 46 makes a second set of color measurements using photodetectors 46D, and green pixels 36G may separately emit green light while light sensor 46 makes a third set of color measurements using photodetectors 46D. The use of multiple different colors of illumination from display 14 allows sensor 46 to gather more spectral data than possible with a single white light source (e.g., by gathering three different sets of measurements when there are three different illumination colors to use), which can enhance color measurement accuracy. More accurate color measurements can be made (e.g., to produce an accurate color spectrum) by including more colors of light-emitting devices (e.g., pixels 36 and/or light-emitting devices in sensor 46) and/or by providing more detector channels (e.g., more photodetectors 46D of different colors).

The sensor reading produced by sensor 46 may be processed by control circuitry 18 and converted into a color value. The color value can be represented in any suitable format. For example, a color value may be represented using color coordinates, a color temperature, color values in a color space (e.g., CIE La*b* color space, XYZ color space, RGB color space, etc.), a correlated color temperature, spectral information (e.g., a visible light spectrum for the light from object 48 and/or infrared and/or ultraviolet spectral information).

If desired, control circuitry 18 may determine the color of external objects using a model that is based on training data gathered during manufacturing. For example, color measurements of different materials may be gathered using a light sensor (e.g., light sensor 46, a light sensor similar to light sensor 46, or other suitable light sensor) during manufacturing to produce training data. The training data may be used to train a model that in turn can be used to estimate colors of different materials. The model (e.g., an algorithm) may be stored on device 10 and used by control circuitry 18 during color sampling operations.

If desired, device 10 may store different algorithms for different types of materials and/or for different classes of objects. For example, a first set of training data may be gathered for watch bands and a second set of training data may be gathered for clothing. Each set of training data may be used to produce a different object-specific algorithm for identifying the color of a particular object. The watch-band-specific algorithm may be used to determine colors of watch bands, whereas the clothing-specific algorithm may be used to determine colors of clothing. If desired, other item-specific algorithms may be stored in device 10 (e.g., a fluorescent-material-specific algorithm trained on fluorescent materials, a pattern-specific algorithm trained on materials with a particular pattern, etc.). A watch-band-specific algorithm trained on watch band color data and a clothing-specific algorithm trained on clothing color data are sometimes described herein as illustrative examples. Training a model on a particular class of items may help improve color measurement accuracy.

Some algorithms in device 10 may be used to map different sensor readings to different colors in a predetermined list of colors (e.g., known watch band colors), whereas other algorithms in device 10 may be used to map sensor readings to any color within a given color gamut. As an example, calibration data may be gathered for a group of materials such as watch bands (e.g., watch bands made by a particular brand or retailer). During manufacturing, sensor measurements may be gathered for each of the different colored watch bands (e.g., a red watch band, a pink watch band, a green watch band, a blue watch band, etc.). The sensor measurements and associated watch band colors may be stored in a look-up table in device 10. During operation of device 10, control circuitry 18 may gather sensor output from sensor 46 and may match the sensor output to the closest sensor reading in the look-up table, which in turn may be mapped to an associated watch band color in the predetermined list of watch band colors. This is example is merely illustrative. If desired, calibration data associated with other materials (e.g., watch bands of different materials such as silicone watch bands, fabric watch bands, metal watch bands, etc., other accessories such as cases or covers made by a particular brand or retailer, clothing, etc.) may be gathered to produce a look-up table that maps different sensor measurements to different colors in a predetermined list of colors.

Instead of or in addition to storing a look-up table that maps different sensor readings to different colors from a predetermined list of colors, control circuitry 18 may be configured to estimate an absolute color of a material within a continuum of values (e.g., any color within the display color gamut). For example, control circuitry 18 may analyze sensor data from sensor 46 to estimate the reflectance of a material (e.g., by measuring an amount of reflected light 24' detected by sensor 46 for each color), which in turn may be mapped to any color within a given color gamut.

Figure 5:
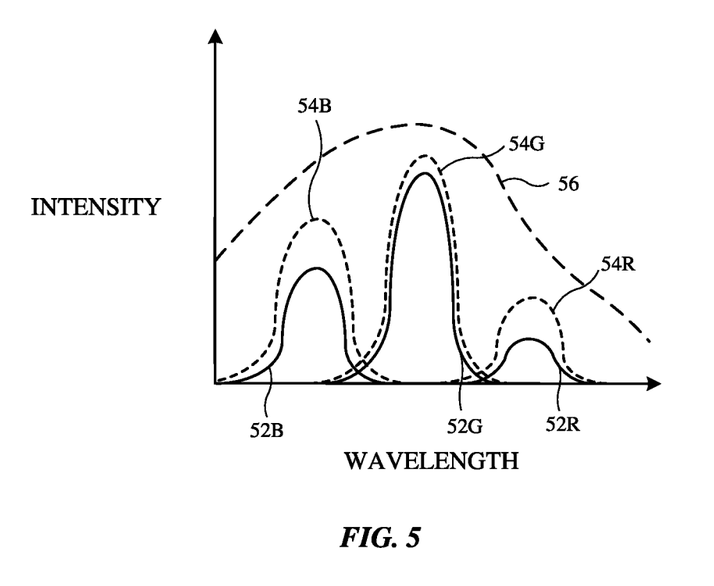
FIG. 5 is a graph showing illustrative reflectance data that may be gathered to determine the color of a material in accordance with an embodiment.

FIG. 5 is a graph of illustrative reflectance data associated with an external object. Curve 56 represents the actual reflectance spectrum of the external object (e.g., a watch band, a piece of fabric, etc.). Curves 54B, 54G, and 54R correspond respectively to blue light 24 emitted from blue pixels 36B, green light 24 emitted from green pixels 36G, and red light 24 emitted from red pixels 36R that is used to illuminate object 48 (e.g., sequentially and/or simultaneously). Curves 52B, 52G, and 52R correspond respectively to the reflected blue light 24', reflected green light 24', and reflected red light 24' that is reflected from object 48 and detected by sensor 46. Control circuitry 18 in device 10 may determine the color of object 48 based on reflectance data such as color measurements 52B, 52G, and 52R.

During manufacturing, control circuitry 18 may gather reflectance data for a variety of different materials and fabrics and may store corresponding calibration data in device 10. During operation, control circuitry 18 may analyze sensor output from sensor 46 to determine the reflectance of object 48 across the visible spectrum. Using the stored calibration data in device 10 (e.g., stored reflectance data for a variety of different materials), control circuitry 18 may map the sensor output from sensor 46 to a color (e.g., any color in the display color gamut).

Since control circuitry 18 may store different algorithms for determining the color of external objects, control circuitry 18 may select an appropriate algorithm for a given object before the color of the object is measured and/or before the color measurement is processed. Control circuitry 18 may select an appropriate algorithm for determining the color of an external object based on user input (e.g., touch input to touch sensor 80, voice input, and/or other suitable user input) and/or based on sensor data (e.g., data from one or more sensors in device 10 such as touch sensor 80 and/or a camera that indicates what type of material object 48 is made from, whether object 48 is a watch band or item of clothing, etc.).

Figure 6:
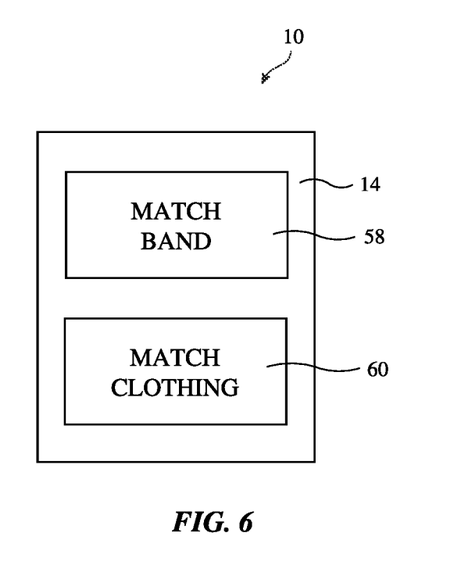
FIG. 6 is a front view of an illustrative display screen that may be used to display color matching options in accordance with an embodiment.

FIG. 6 shows an example in which user input is gathered to determine what algorithm is appropriate for determining the color of object 48. As shown in FIG. 6, display 14 may present on-screen options 58 and 60 for a user before color sampling operations take place. To match display colors to a particular watch band, the user may select on-screen option 58 (e.g., by providing touch input to display 14 on item 58 and/or by providing other suitable input). To match display colors to a particular piece of clothing, the user may select on-screen option 60 (e.g., by providing touch input to display 14 on item 60 and/or by providing other suitable input). Control circuitry 18 may determine which algorithm to use during color sampling operations based on whether the user selects option 58 or option 60. This is merely illustrative, however. If desired, control circuitry 18 may determine which algorithm to use based on other user input and/or based on sensor data (e.g., using image recognition techniques to recognize a watch band or clothing item in images captured using a camera in device 10). After selecting what type of object the user would like to take a color sample of, the user may hold the object in front of display 14 (e.g., in contact with or in close proximity to display 14) so that color sampling operations can take place (e.g., so that display 14 can illuminate the object with different colors while sensor 46 gathers corresponding color measurements).

In addition to or instead of gathering user input to determine the appropriate algorithm for determining the color of external objects, control circuitry 18 may use a sensor to help classify external object 48 and identify an appropriate algorithm for determining its color. For example, touch sensor 80 may gather capacitive information while object 48 is held over display 14. This capacitive information may be indicative of the type of material that object 48 is made of. Materials with different dielectric constants will produce different responses from touch sensor 80. Materials with a relatively high dielectric constant such as metal may result in a higher capacitive reading from touch sensor 80 than materials with a relatively low dielectric constant such as fabric. After determining the type of material that object 48 is made from based on the capacitive sensor data from touch sensor 80, control circuitry 18 may select which algorithm to use based on the type of material and/or may otherwise narrow down the possible results that an algorithm may produce based on the type of material.

If desired, device 10 may store calibration data such as different capacitive touch sensor responses for different classes of materials (e.g., metal, fabric, silicone, plastic, leather, etc.). Device 10 may use this calibration data to classify materials during color sampling operations. For example, control circuitry 18 may gather capacitive sensor readings from touch sensor 80 while object 48 is held in contact with or in close proximity to display 14. Based on the capacitive sensor readings and stored calibration data, control circuitry 18 may determine what type of material object 48 is made from (e.g., metal, non-metal, fabric, silicone, leather, etc.). This material classification process may in turn be used to refine the color measurement process by narrowing down the available color options for a particular material. For example, if control circuitry 18 determines based on the capacitive reading from touch sensor 80 that object 48 is made from metal, then control circuitry 18 may use a first algorithm to analyze the sensor output from sensor 46 (e.g., an algorithm trained on metal watch bands or other metal items). On the other hand, if control circuitry 18 determines based on the capacitive reading from touch sensor 80 that object 48 is made from fabric or some other non-metal material, then control circuitry 18 may use a second, different algorithm to analyze the sensor output from sensor 46 (e.g., an algorithm trained on non-metal watch bands or other non-metal items).

Figure 7:
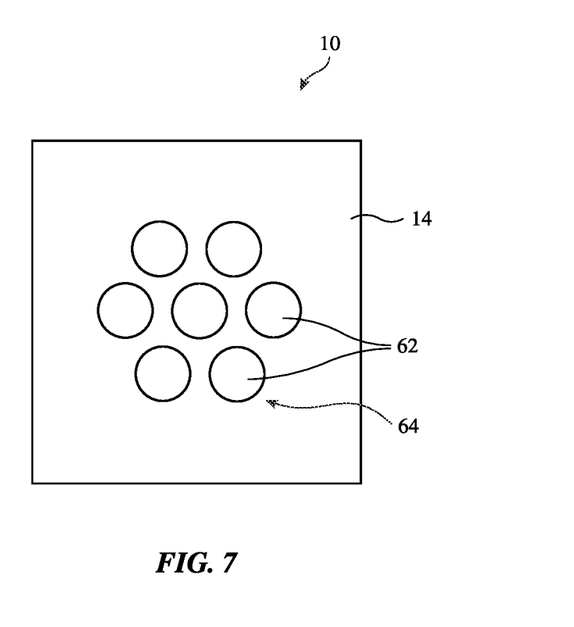
FIG. 7 is a front view of an illustrative display screen that may be used to display one or more color options after color sampling operations have taken place in accordance with an embodiment.

Control circuitry 18 may use the appropriate algorithm to determine the color of the object based on the color measurements gathered during color sampling operations. Once the color of the object is determined, control circuitry 18 may automatically update the background, display elements, user interface elements, or other items on display 14 to include the color of the object. In other arrangements, control circuitry 18 may generate a palette of colors based on the measured color and may display the palette of colors on display 14, as shown in FIG. 7. Color palette 64 on display 14 may include different colors 62 that are generated based on the measured color of external object 48. For example, in addition to including the measured color itself, colors 62 may include similar colors, complementary colors, paired colors, and/or other sets of colors that are generated based on the measured color. This allows the user to choose what display colors to use on display 14 based on the options in palette 64.

If desired, control circuitry 18 may apply constraints to restrict what colors may be used on display 14. For example, constraints may be applied so that the display has sufficient contrast, brightness, readability, etc. Constraints may also be applied to achieve a desired aesthetic (e.g., to obtain the closest match to predetermined palette of colors set by the user, the manufacturer, etc.). Control circuitry 18 may, if desired, map the measured color of the external object to a slightly different acceptable display color based on the constraints.

Figure 8:
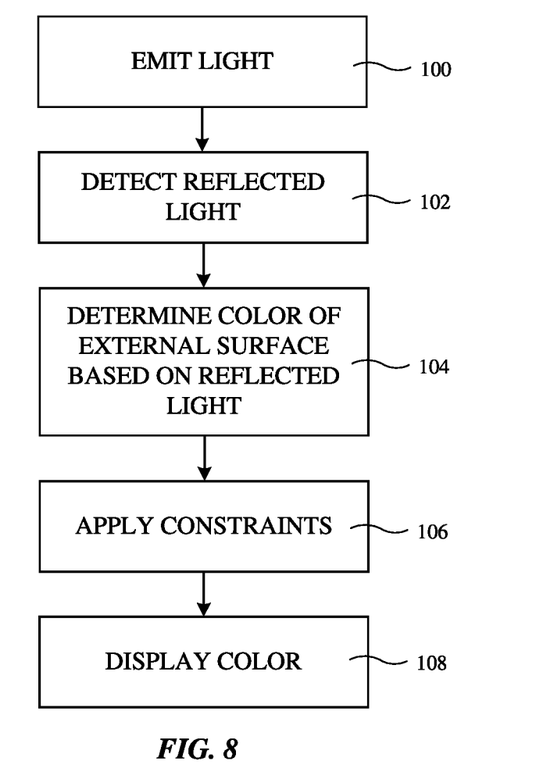
FIG. 8 is a flow chart of illustrative steps involved in matching a display color to a color on an external surface in accordance with an embodiment.

FIG. 8 is a flow chart of illustrative steps involved in matching colors on a display to colors of external objects. Device 10 may initiate the gathering of a color measurement in response to detection of any suitable color measurement trigger criteria (color measurement gathering criteria). As an example, device 10 may use sensor 46 to gather a color measurement in response to detecting touch input on display 14, in response to detecting button activation indicating that a button has been pushed, in response to detecting that sensor 46 is adjacent to an item for which a color measurement is desired (e.g., as determined based on output from an optical proximity sensor, a capacitive proximity sensor, an acoustic proximity sensor, a force sensor, a switch-based input device, or output from other proximity detection circuitry), in response to output from a sensor that measures the position, orientation, and/or movement of device 10 such as an internal measurement unit (e.g., an accelerometer, compass, and/or gyroscope), in response to output from other sensors 22, and/or in response to output from two or more, three or more, or four or more of these input devices in a sensor fusion arrangement. If desired, device 10 may instruct a user (e.g., via display 14, speakers, and/or other output device) to hold the desired external object (e.g., object 48 of FIG. 4) over display 14 so that the color of the external object can be measured.

During the operations of block 100, control circuitry 18 may use display 14 to emit light 24 towards external object 48. This may include using pixels 36 of a first color (e.g., red pixels 36R) to illuminate external object 48 with the first color of light (e.g., red light), then using pixels 36 of a second color (e.g., green pixels 36G) to illuminate external object 48 with a second color of light (e.g., green light), and then using pixels 36 of a third color (e.g., blue pixels 36B) to illuminate external object 48. This is, however, merely illustrative. If desired, pixels 36 may illuminate external object 48 with multiple colors of light simultaneously and/or may emit light having any other suitable pattern, sequence of colors, etc. Arrangements in which light is emitted from a light emitter that is not one of pixels 36 (e.g., a light emitter in sensor 46 and/or a light emitter elsewhere in device 10) may also be used, if desired.

During the operations of block 102, control circuitry 18 may use sensor 46 to measure reflected light 24' that is reflected off of external object 48 towards device 10. Color measurements may be gathered using a single broadband channel in light sensor 46 or may be gathered using multiple color channels 46D in light sensor 46. The color measurement operations of block 102 may occur while object 48 is being illuminated with display light (e.g., may occur at the same time as the operations of block 100), if desired.

During the operations of block 104, control circuitry 18 may determine the color of external object 48 (e.g., the color of the surface of external object 48 that is facing display 14) based on the color measurements gathered during the operations of block 102. This may include, for example, running an algorithm that maps reflected light measurements (e.g., measurements of reflected red light, green light, and blue light) to an output color. The algorithm that control circuitry 18 uses to map the color measurements to an output color may be based on the type of object being sampled (e.g., whether object 48 is a watch band, a piece of clothing, or other item). For example, control circuitry 18 may use a watch-band-specific algorithm in response to user input, sensor input, or other input indicating that object 48 is watch band, or may use a clothing-specific algorithm in response to user input, sensor input, or other input indicating that object 48 is a piece of clothing.

During the operations of block 106, control circuitry 18 may optionally apply constraints to constrain the measured color to an acceptable color for display 14. For example, constraints may be applied so that display 14 has sufficient contrast, brightness, readability, etc. This may include, for example, mapping the output color from step 104 to a slightly different color so that the color has sufficient contrast with other elements on display 14. In other arrangements, control circuitry 18 may map the output color to a slightly different color based on artistic constraints set by the user, the manufacturer of device 10, or other party. This is merely illustrative, however. If desired, control circuitry 18 may display the output color as measured in step 104 without applying constraints to make any adjustments to the output color.

During the operations of block 108, control circuitry 18 may display the measured color (e.g., the color measured in block 104 and/or the constrained color modified in step 106) on display 14. If desired, display 14 may display a palette of colors that are generated based on the measured color (e.g., as shown in FIG. 7), may display the measured color as the background of display 14 (e.g., background 72 of FIG. 1), may display the measured color for other display elements (e.g., display elements 70 of FIG. 1), and/or may save the color in a list of colors that the user can select from (e.g., to display at a later time).

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a display that emits light towards an external object in front of the display;
   a light sensor behind the display that detects the light after the light reflects from the external object; and
   control circuitry that:
      stores a watch-band-specific algorithm for determining watch band colors and a clothing-specific algorithm for determining clothing colors;
      selects either the watch-band-specific algorithm or the clothing-specific algorithm based on user input;
      after selecting the watch-band-specific algorithm or the clothing-specific algorithm, gathers sensor data from the light sensor; and
      determines a color of the external object based on the sensor data using the selected watch-band-specific algorithm or the clothing-specific algorithm.

2. The electronic device defined in claim 1 wherein the control circuitry displays the color on the display.

3. The electronic device defined in claim 2 wherein the color is used as a background on the display.

4. The electronic device defined in claim 1 wherein the watch-band-specific algorithm is trained on watch bands and the clothing-specific algorithm is trained on clothing.

5. The electronic device defined in claim 4 wherein the watch-band-specific algorithm maps the sensor data to a given watch band color in a predetermined list of watch band colors and the clothing-specific algorithm maps the sensor data to a given color within a color gamut.

6. The electronic device defined in claim 1 wherein the display comprises red pixels, green pixels, and blue pixels, wherein the display emits light towards the external object by sequentially emitting red light with the red pixels, green light with the green pixels, and blue light with the blue pixels, and wherein the control circuitry measures a reflectance of the external object by measuring what portion of the emitted red, green, and blue light is reflected back to the light sensor.

7. The electronic device defined in claim 1 wherein the control circuitry generates a palette of different colors based on the color and displays the palette on the display.

8. The electronic device defined in claim 1 wherein the light sensor comprises a single channel that spans the visible spectrum.

9. The electronic device defined in claim 1 wherein the light sensor comprises multiple light detectors with different color channels.

10. The electronic device defined in claim 1 wherein the display comprises pixels and wherein the light sensor detects the light after the light passes between the pixels.

11. An electronic device, comprising:
    a light sensor comprising a first detector with a red color filter, a second detector with a green color filter, and a third detector with a blue color filter;
    a display having an array of organic light-emitting diode pixels that overlaps the first, second, and third detectors of the light sensor; and
    control circuitry that gathers color measurements with the light sensor while the array of organic light-emitting diode pixels illuminates an external object in front of the display, wherein the control circuitry determines a color of the external object based on the color measurements using a selected one of a watch-band-specific algorithm and a clothing-specific algorithm that are stored in the electronic device.

12. The electronic device defined in claim 11 wherein the light sensor detects light emitted by the array of organic light-emitting diode pixels.

13. The electronic device defined in claim 11 wherein the control circuitry displays the color on the display.

14. The electronic device defined in claim 11 wherein the control circuitry maps the color to an acceptable display color and displays the acceptable display color on the display.

15. The electronic device defined in claim 11 wherein the array of organic light-emitting diode pixels emits a sequence of red light, green light, and blue light that reflects off of the external object and wherein the color measurements correspond to a reflected portion of the red light detected by the first detector, a reflected portion of the green light detected by the second detector, and a reflected portion of the blue light detected by the third detector.

16. An electronic device, comprising:
a display having a pixel array that illuminates an external object;
a light sensor behind the pixel array that detects reflected light from the external object; and
control circuitry that:
stores first and second different algorithms for determining a color of the external object, wherein the first algorithm is a watch-band-specific algorithm and the second algorithm is a clothing-specific algorithm;
selects either the first or second algorithm based on touch input on the display;
uses the selected first or second algorithm to determine the color of the external object based on the reflected light; and
displays the color on the pixel array.

17. The electronic device defined in claim 16 wherein the touch input indicates a selection of a first option to match a color of the display to a watch band or a second option to match the color of the display to clothing.

18. The electronic device defined in claim 16 wherein the light sensor comprises a single channel that spans the visible spectrum.

19. The electronic device defined in claim 16 wherein the light sensor comprises a first light detector for detecting light of a first color, a second light detector for detecting light of a second color, and a third light detector for detecting light of a third color.

* * * * *